S. R. BRYANT.
Wheel Tire.

No. 104,824.

Patented June 28, 1870.

Witnesses:
J. W. Bowman
M. H. Raser

Inventor:
S. R. Bryant

United States Patent Office.

S. R. BRYANT, OF WATERFORD, PENNSYLVANIA.

Letters Patent No. 104,824, dated June 28, 1870.

IMPROVEMENT IN HOLLOW METALLIC RIM OR FELLY.

The Schedule referred to in these Letters Patent and making part of the same

*To all whom it may concern:*

Be it known that I, S. R. BRYANT, of Waterford, in the county of Erie and State of Pennsylvania, have invented a new and useful article of manufacture; and I do hereby declare that the following is a full and exact description thereof, reference being had to the accompanying drawings and to the letters of reference marked thereon.

Similar letters of reference indicate corresponding parts of the several figures.

The object of this invention is to obtain a rim or felly of more durability, greater strength, less weight, easy to construct, and at less expense.

To enable others skilled in the art to make and use my invention, I will proceed to describe its construction and operation.

I construct a rim or felly of steel or other unwrought metal, of thin plates or bars, by passing it through rollers or dies, which turns it up in the form of a letter, U, or in any other form that may be required for strength or beauty, and also at the same operation give it the necessary form or circle of the wheel that is required.

I also construct a tire of steel or iron, by passing through rollers or dies, which form a flange or rim on each edge of the tire, which shut over the edges of the plain rim, as at *a*, which is to strengthen and prevent the rim from spreading, and also to retain the tire in its proper place on the wheel without the use of bolts or other means of attachment.

For heavy drays or wagons which are to be used on pavements or other roads that are liable to cut or wear in furrows, I construct the rim double, with or without flange, as at *b*, and flanged tire or plain or flat, as at *b*.

These heavy or double rims may be provided with two sets of spokes in the same hub, as at *d d*, for the purpose of giving greater strength, and at the same time can be made very light and durable, and easy to construct.

These rims may be used in connection with wooden or metallic spokes.

If metallic spokes are to be used, they can be attached, as at *e*, by means of a metallic socket or thimble, which receives the end of the spoke.

Figure 3:
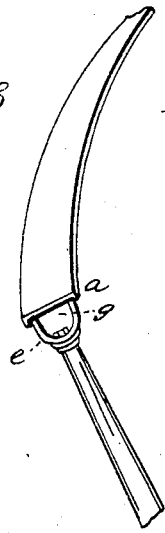
Figure 3 is an end view of the single plain rim and flanged tire, and the metallic socket tenon for the attachment of the spokes.
Figure 2:
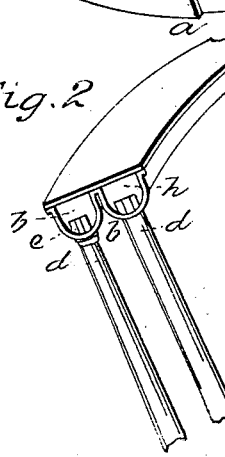
Figure 2 is an end view of the double-flanged rim and plain tire, and its attachments to the spokes.

The tenon on the end of the spoke passes through the socket and rim, and receives the nut *f*, fig. 2, which holds the rim firmly in place, or it may be secured to the wooden spokes, as at *e*, fig. 3, by means of the metallic thimble *e*, to receive the end of the spoke, but not having the tenon pass through the rim, although it has a large-headed wood-screw, *g*, fig. 3, passing through the rim and socket into the end of the spoke, which holds all firmly in place; or it may be fastened as at *d*, fig. 2, by cutting the end of the spoke to fit the rim, and having the tenon of the wood pass through the rim and receive the large nut *h*, fig. 2.

Figure 1:
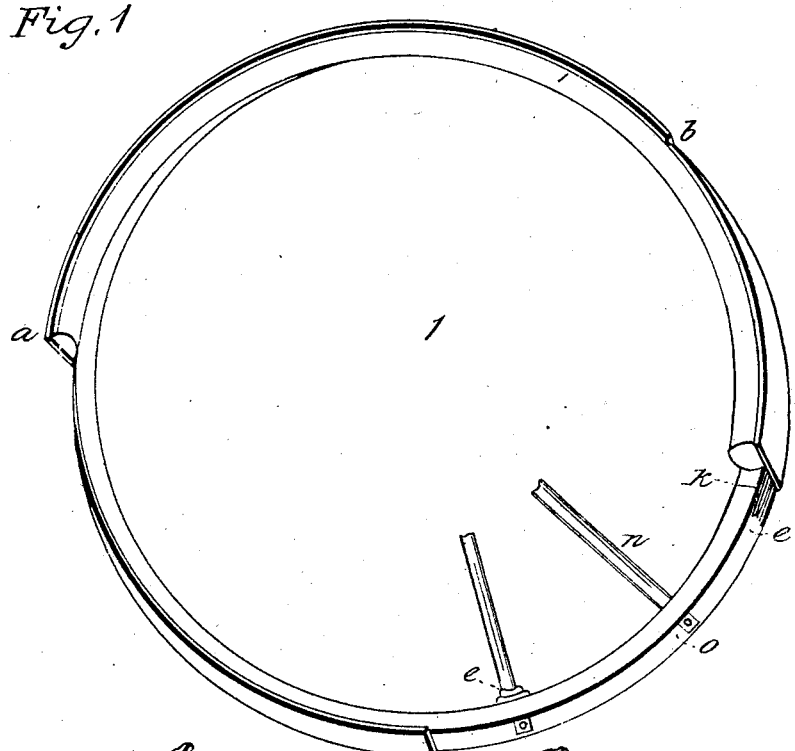
Figure 1 is a perspective view of the double and single flanged rim, flat or plain, and flanged tire, and their attachments to the spokes.

The ends of the rim are secured and held firmly in place by the plate or stay *i*, which fits within the outer rim, and is held in place by the bolts *k*; or it may be of wood, as at *l*, fig. 1, which is fitted in the rim and fills it flush with the tire, which makes the rim as strong at the joint as at any other part, and not weaker, as in common rims.

For a very broad tread the tire may be flat without the flanges, but to be used with the flanged rim.

Figure 4:
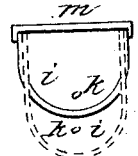
Figure 4 is an end view of the flanged tire and plain single rim, showing the splice or mode of connecting the ends of the rim.

The flanged tire is to be used in connection with the plain rims, as at *m*, fig. 4, or with the flanged rims, as at *a*, fig. 1.

If metallic spokes are used, as at *n*, fig. 1, they may be secured by tenons passing through the rims, and having nuts or screws, as at *o*, fig. 1.

The advantages claimed for these rims are their strength and durability at less expense, their ease of construction, neatness, and not liable to get out of repair.

The rims and tire being of metal contract and expand together, which keeps the tire and rim always tight and in its proper place, which is not the case in the wooden rim and metal tire. These rims may be used with any kind of hub, either wood or metal.

I do not claim, broadly, the use of steel tire; but

I do claim and wish to secure by Letters Patent—

The rims and tire, in combination, and the mode of attachment, or their equivalents, as and for the purposes set forth.

S. R. BRYANT.

Witnesses:
J. W. BOWMAN,
M. H. RASER.